United States Patent
Duerschinger (10) Patent No.: US 6,722,282 B2
(45) Date of Patent: Apr. 20, 2004

(54) IGNITION CAPSULE, WHICH CAN BE INDUCTIVELY ACTIVATED, FOR OCCUPANT RESTRAINT SYSTEMS, AND A TEST CIRCUIT FOR SAID IGNITION CAPSULE

(75) Inventor: Guenter Duerschinger, Fuerth (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/149,918

(22) PCT Filed: Dec. 15, 2000

(86) PCT No.: PCT/DE00/04490
§ 371 (c)(1),
(2), (4) Date: Oct. 15, 2002

(87) PCT Pub. No.: WO01/44023
PCT Pub. Date: Jun. 21, 2001

(65) Prior Publication Data
US 2003/0226466 A1 Dec. 11, 2003

(30) Foreign Application Priority Data
Dec. 17, 1999 (DE) .................. 199 61 134

(51) Int. Cl.⁷ .................................................. F42C 11/04
(52) U.S. Cl. ............................................................ 102/209
(58) Field of Search .................................. 102/209, 206

(56) References Cited

U.S. PATENT DOCUMENTS

| | | | | |
|---|---|---|---|---|
| 3,185,093 A | | 5/1965 | Holinbeck | |
| 3,721,884 A | * | 3/1973 | Thakore | 361/251 |
| 3,759,183 A | * | 9/1973 | Apstein | 102/206 |
| 4,242,631 A | | 12/1980 | Hall | |
| 4,300,452 A | * | 11/1981 | Beuchat et al. | 102/270 |
| 4,350,096 A | * | 9/1982 | Cannavo et al. | 102/209 |
| 4,377,113 A | * | 3/1983 | Florence | 102/209 |
| 4,414,901 A | * | 11/1983 | Sellwood | 102/206 |
| 5,799,972 A | * | 9/1998 | Handman et al. | 280/735 |
| 5,803,494 A | | 9/1998 | Headley | |
| 5,905,343 A | | 5/1999 | McCamant | |
| 6,470,803 B1 | * | 10/2002 | Liu et al. | 102/206 |

FOREIGN PATENT DOCUMENTS

| | | |
|---|---|---|
| DE | 2433555 | 1/1976 |
| DE | 3812633 | 10/1989 |
| DE | 3838896 | 5/1990 |
| DE | 19530586 | 2/1997 |
| DE | 19733353 | 12/1998 |
| DE | 19814589 | 10/1999 |
| GB | 1416095 | 12/1975 |

* cited by examiner

Primary Examiner—Charles T. Jordan
Assistant Examiner—Jordan Lofdahl
(74) Attorney, Agent, or Firm—Millen, White, Zelano & Branigan, P.C.

(57) ABSTRACT

The invention relates to a firing capsule for the gas generator of a passenger restraint system in a motor vehicle, especially for the gas generator of an inflatable impact protection cushion (airbag), in which the electrical energy necessary for detonating the igniting agent is inductively coupled into the firing capsule from the outside by means of alternating magnetic fields. The secondary circuit located in the firing capsule is formed by a closed resistance wire which is applied to a carrier plate of insulating or poorly conductive material.

29 Claims, 7 Drawing Sheets

IGNITION CAPSULE, WHICH CAN BE INDUCTIVELY ACTIVATED, FOR OCCUPANT RESTRAINT SYSTEMS, AND A TEST CIRCUIT FOR SAID IGNITION CAPSULE

The invention relates to an inductively activatable firing capsule for the gas generator of a passenger restraint system in a motor vehicle as claimed in the preamble of claim 1.

One such firing capsule is known from U.S. Pat. No. 5,799,972 A. In this prior art a transformer is connected to the trigger circuit and electrically isolates the firing capsule from the trigger current source. GB 1 416 095 A describes a firing capsule in which the electrical energy necessary for the detonation process is likewise inductively coupled in. For this reason, outside the firing capsule there is a primary winding, while in the interior of the capsule there is a secondary winding. The two ends of the secondary winding spaced apart from one another dip into an electrically conductive igniting agent which is caused to explode by current flowing through it. Finally, U.S. Pat. No. 3,185,093 discloses an inductively activatable firing capsule for different applications in which the secondary winding within the capsule is applied to a core and the ends of the secondary winding are connected by a resistance wire which penetrates the igniting agent.

The object of the invention is to develop an inductively activatable firing capsule of the initially mentioned type such that misfires as a result of broken or corroded resistance wires are reliably avoided.

This object is achieved by the inductively activatable firing capsule with the features cited in claim 1. Advantageous developments and embodiments are given in the dependent claims.

The inventive idea is to replace the thin, fracture-endangered resistance wire of conventional firing capsules by an especially simple and at the same time invulnerable construction.

The invention is detailed below using embodiments.

Figure 1:
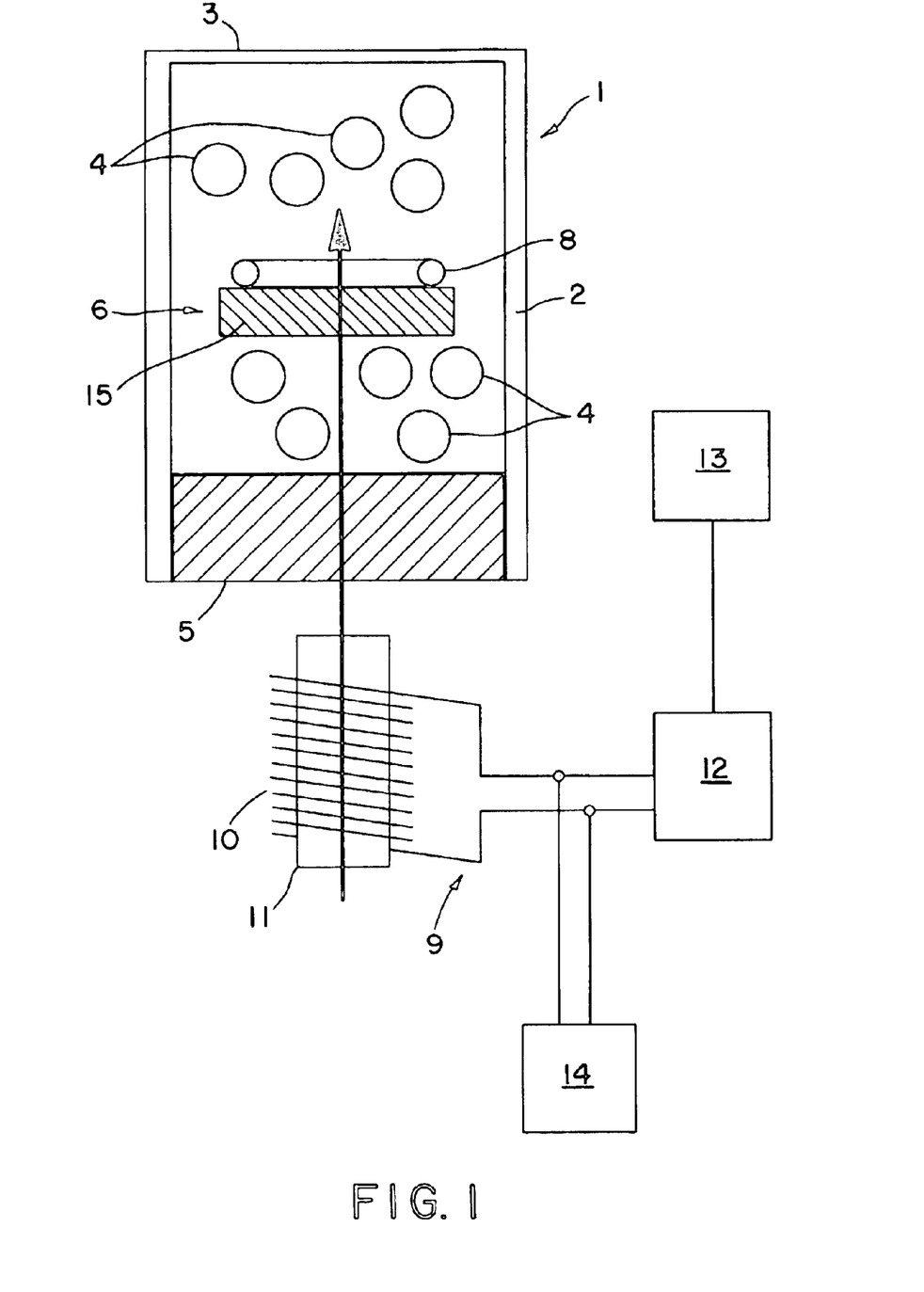

FIG. 1 schematically shows a section through the firing capsule 1 as claimed in the invention, and in the form of a block diagram the pertinent trigger circuit 12 and a test circuit 14. The firing capsule 1 has a pot-shaped housing 2 which is filled at least partially with an igniting agent 4. The top of the firing capsule 1 facing the interior of the gas generator which is not shown here is made as a bursting disk 3 or has scoring so that it is ensured that in the case of a motor vehicle collision the hot explosion gases travel quickly and reliably into the interior of the gas generator, where they cause the propellant charge to detonate. The housing 2 on its bottom is hermetically sealed by a sealing body 5. Within the housing 2 is a closed resistance wire 8 which penetrates the igniting agent 4 and which forms a secondary circuit 6. The resistance wire 8 is applied to a carrier plate 15 of insulating or poorly conductive material. Electrical supply lines which are routed from the outside into the firing capsule and thus which can be the cause of a misfiring are thus absent. (Moisture, electrostatic charges or leakage currents.) Outside the housing 2 is the magnet core 11 of magnetic or magnetizable material, hereinafter the magnet core 11 for short, which is surrounded by a primary winding 10. The magnetic flux produced by the primary winding 10 in conjunction with the magnet core 11 is illustrated by an arrow which penetrates the sealing body 5 of the firing capsule 1 and the closed resistance wire 8 which is located in the housing 2. The number of turns of the primary winding 10 is such that in the secondary circuit a relatively strong current is induced which reliably causes the resistance wire 8 to glow or melt and thus causes the explosion of the igniting agent 4.

The primary winding 10 together with a trigger circuit 12 forms a primary circuit 9. The trigger circuit 12 is connected to an impact sensor 13. In the case of motor vehicle collision the impact sensor 13 delivers a signal to the trigger circuit 12, as a result of which it generates a relatively large AC voltage. The AC voltage can be for example sinusoidal or rectangular. What is decisive for the operation of the firing capsule is simply that as a result of this AC voltage on the secondary side an alternating current is induced which heats the resistance wire 8 enough.

A test circuit 14 is connected parallel to the primary winding 10. At regular time intervals, for example at an interval of a few seconds, or continuously, this circuit produces a weak AC voltage with a frequency which can be clearly different from the AC voltage which is made available for detonation, therefore for example can be much higher. As long as the resistance wire 8 together with the secondary circuit 6 forms a closed secondary circuit 6, this circuit is therefore in other words intact, the test circuit 14, as soon as it delivers its test signals to the primary winding 10, is loaded with respect to power in an exactly defined manner.

To implement the test circuit 14, besides an AC voltage generator for generating the test voltage, therefore only one circuit is necessary which detects a change in the load by the secondary circuit and thereupon delivers a warning signal, which can be for example acoustic or optical. A circuit in which a test signal is inductively coupled into the current feed line of a conventional firing capsule of an airbag is known from publication DE 38 12 633 C2. In contrast to this prior art, the test signal in the test circuit used here is coupled into a secondary circuit which is completely electrically insulated from the environment and which is formed by the resistance wire 8. One special advantage of this arrangement is that the test signal, if it causes only minimum heating of the resistance wire, can also be sent quite without interruption.

In the embodiment shown in FIG. 2, the secondary circuit 6 of the firing capsule 1 consists likewise of one closed ring of resistance wire 8, as is detailed below using FIG. 6.

On either side of the firing capsule 1 there are a first primary winding 10a and a second primary winding 10b with one magnet core 11a, 11b each. The two primary windings 10a, 10b are supplied with alternating current in case of a motor vehicle collision by two trigger circuits 12a, 12b in the above explained manner. The magnetic fields produced in doing so penetrate the closed ring of resistance wire 8 in the same direction, as symbolized in FIG. 2 by an arrow, and induce the heating current necessary for detonating the igniting agent 4.

This special configuration of the firing capsule as claimed in the invention enables very effective protection against misfires which are caused by faults in the trigger circuit. If specifically the alternating currents flowing in the two primary circuits 9a, 9b are dimensioned such that first the simultaneous interaction of the two circuits heats up the resistance wire 8 to the required detonation temperature, then one of the primary circuits can be actuated as a result of a technical fault, without misfiring with fatal consequences occurring. Of course the firing capsule as claimed in the invention can also be equipped with more than two interacting primary circuits. In one preferred embodiment there are 4 primary windings around the firing capsule, with an inductive power dimensioned such that only the interaction of 3 primary circuits leads to detonation. Therefore the system remains fully serviceable even if one of the primary circuits has failed. At the same time misfires of the aforementioned type are reliably prevented. Of course at least one of the primary circuits can again be equipped with the above described test circuit 14.

Figures 3A, 3B:
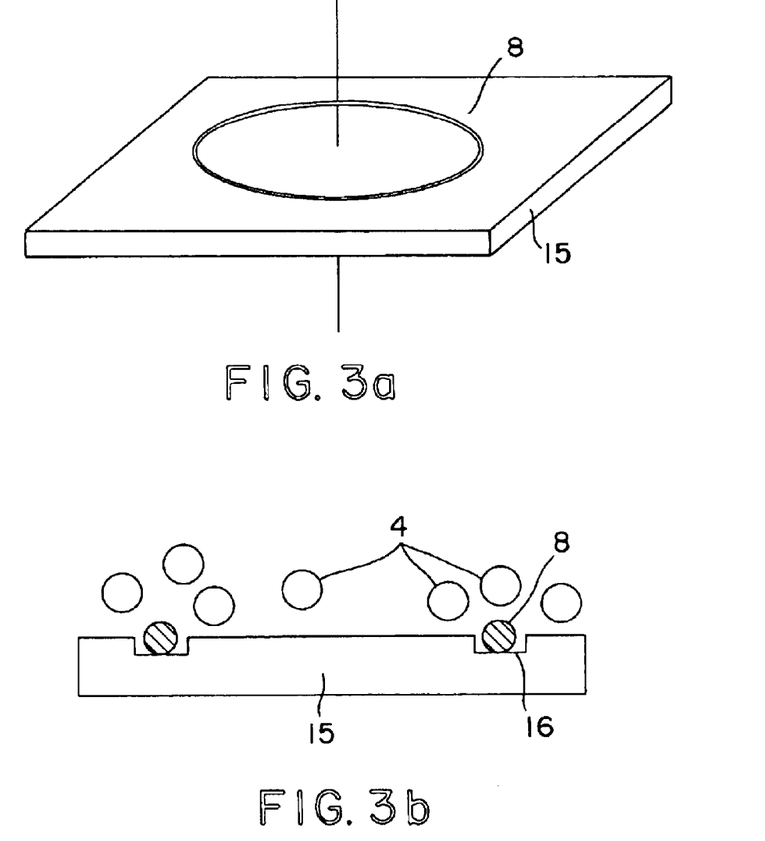
Figure 3C:
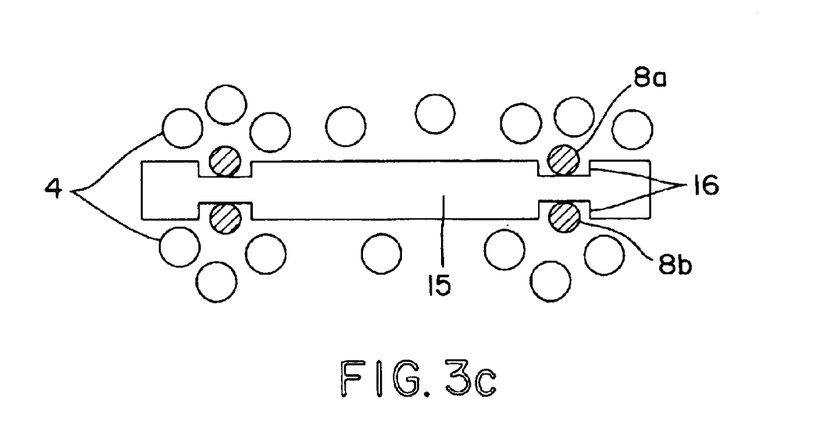

FIG. 3a shows in a perspective how the resistance wire 8 which is made as a closed conductor loop can be safely accommodated in the firing capsule 1 as claimed in the invention. For this purpose the resistance wire 8 is fixed on a carrier plate 15 of insulating or poorly conductive material. Here the arrow also illustrates how the secondary circuit is penetrated by the alternating magnetic field of the primary circuit for purposes of inductive energy coupling. It is advantageous if the wire, as is shown in FIG. 3b in a section, is inserted into a groove 16 of the carrier plate 15. Reference number 4 in turn labels the igniting agent. FIG. 3c shows in a section another embodiment in which two annular resistance wires 8a, 8b are mounted electrically insulated from one another on either side of the carrier plate 15. If one of the resistance wires fails, for example, due to corrosion, the firing capsule still remains fully serviceable. It goes without saying that several arrangements of the type shown in FIG. 3c can be housed stacked on top of one another or next to one another in a firing capsule as claimed in the invention. In this case it is especially advantageous if the housing 2 of the firing capsule 1 is surrounded directly by the primary winding 10; 10a, 10b, i.e. is used as the winding body for the primary winding, as is already known otherwise from the initially cited publication U.S. Pat. No. 3,185,093.

Figure 4:
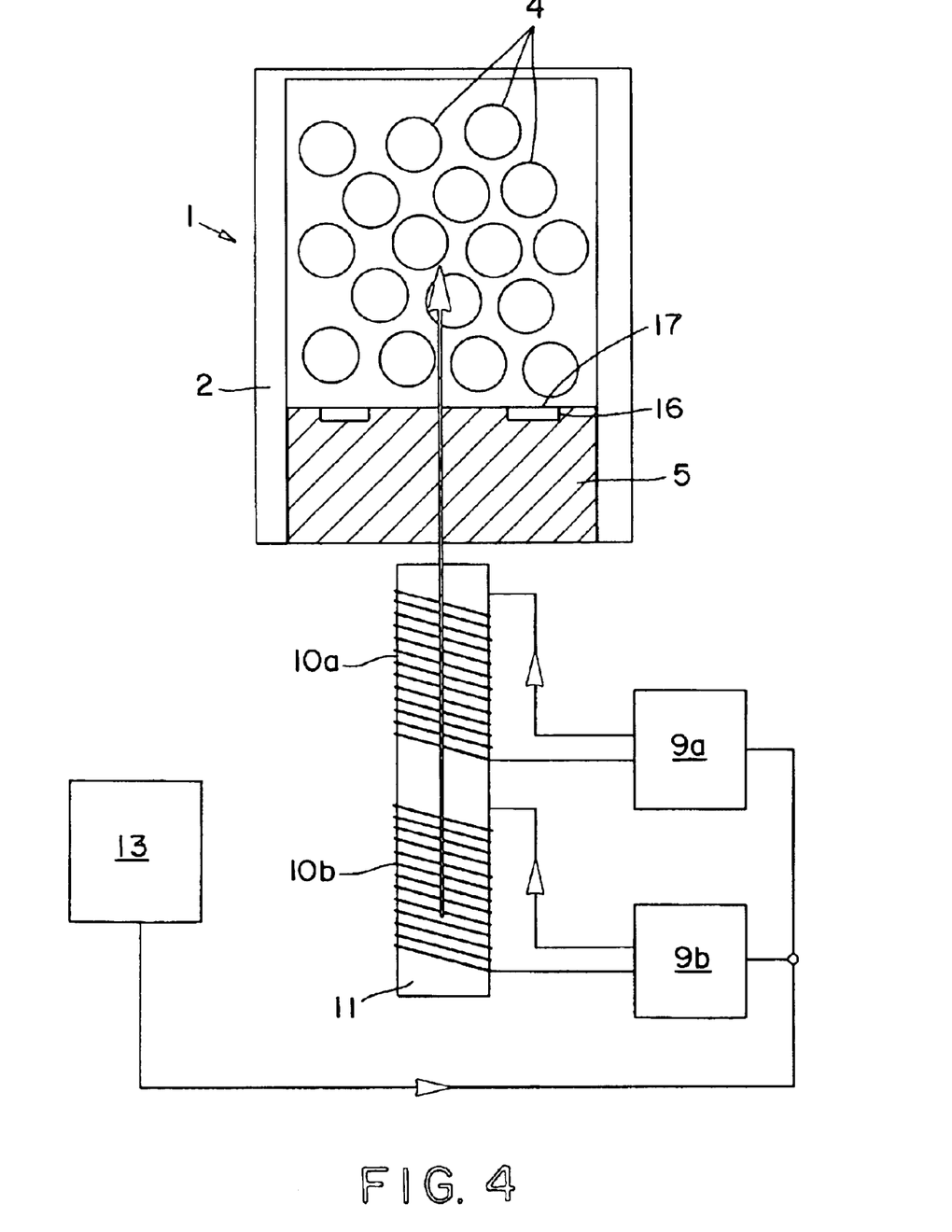

FIG. 4 shows a section through another embodiment of an inductively activatable firing capsule 1 as claimed in the invention. The firing capsule 1 in turn has a housing 2 which is hermetically sealed by a sealing body 5. At this point the sealing body 5 assumes the part of a carrier plate 15 and like it is made of an insulating or poorly conductive material. In the sealing body 5 a closed groove 16 is made which is filled with a metal layer 17. The metal layer 17 assumes the part of the closed resistance wire 8 which had been used in the past. Thus, in a manner similar to in the embodiments as shown in FIGS. 1 to 3, a secondary winding consisting of exactly one turn is formed and the heat output required for detonation is in turn inductively coupled into the firing capsule 1. For this reason, outside of the firing capsule 1 there are two primary windings 10a, 10b with a host of turns which are wound onto a common magnet core 11 for better routing of the magnetic flux. In the case of a motor vehicle collision an impact sensor 13 delivers the signal which is illustrated by an arrow to two trigger circuits 9a, 9b, of which each then sends an alternating trigger current into the primary winding 10a and 10b assigned to it. The entire arrangement is configured such that the magnetic fluxes produced in the two primary windings are rectified at each instant, that therefore overall due to superposition a resulting magnetic flux is formed, which, as the vertical arrow is intended to indicate, penetrates the secondary circuit free of loss as much as possible. The two primary circuits, as have already been discussed in detail, are dimensioned for reasons of safety such that the heat output which can be inductively coupled into the secondary circuit by each individual one of them, is not enough to cause the igniting agent to explode. Misfires are thus essentially precluded. Only when the two primary circuits are activated by the signal of the impact sensor 13 is the metal layer 17 heated so dramatically that detonation of the igniting agent 4 occurs. It can be especially advantageous to trigger each of the two primary circuits via a separate impact sensor 13. It goes without saying that more than two primary circuits can also be used; in a simpler version the novel firing capsule of course also makes do with a single primary circuit.

Figure 5:
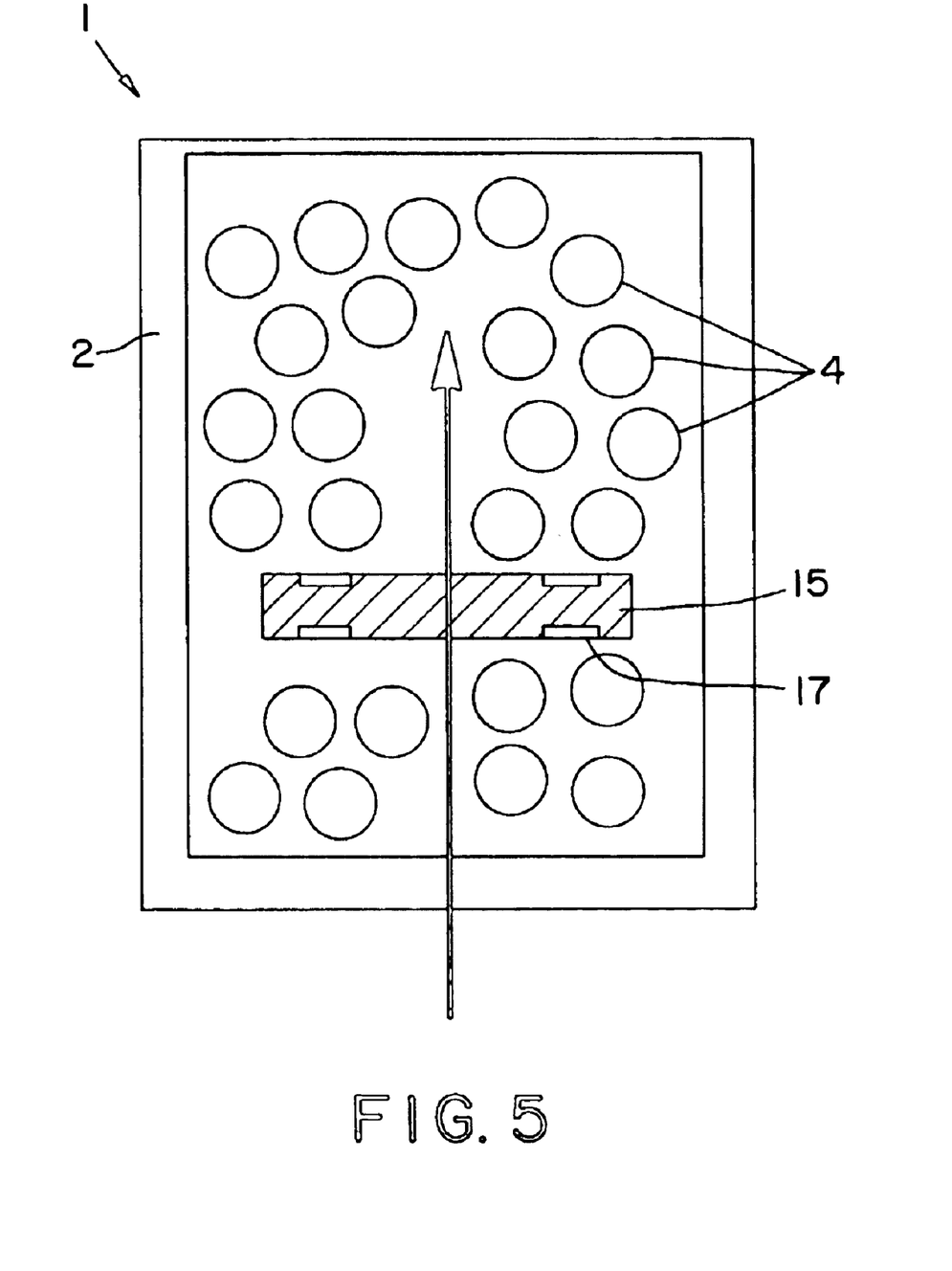

In the embodiment shown in FIG. 5, the firing capsule 1 as claimed in the invention is not sealed by a separate sealing body 5, but has an already closed, for example, welded housing 2 in which the igniting agent 4 is located. Within the housing 2 of the firing capsule 1 there is a carrier plate 15 of insulating or poorly conductive material which is surrounded by the igniting agent 4 and which on each side has an annular groove 16 in which at least one metal layer 17 is placed. In this example there are thus two secondary circuits which are electrically insulated from one another. In turn, the vertical arrow illustrates the magnetic flux which is produced by at least one primary winding which is however no longer shown here, in the case of a motor vehicle collision. In the two secondary circuits this magnetic flux induces currents by which the two circuits are heated up and thus cause the igniting agent 4 to explode. The firing capsule as claimed in the invention then also remains serviceable even if one of the two secondary circuits for example fails.

Figure 2:
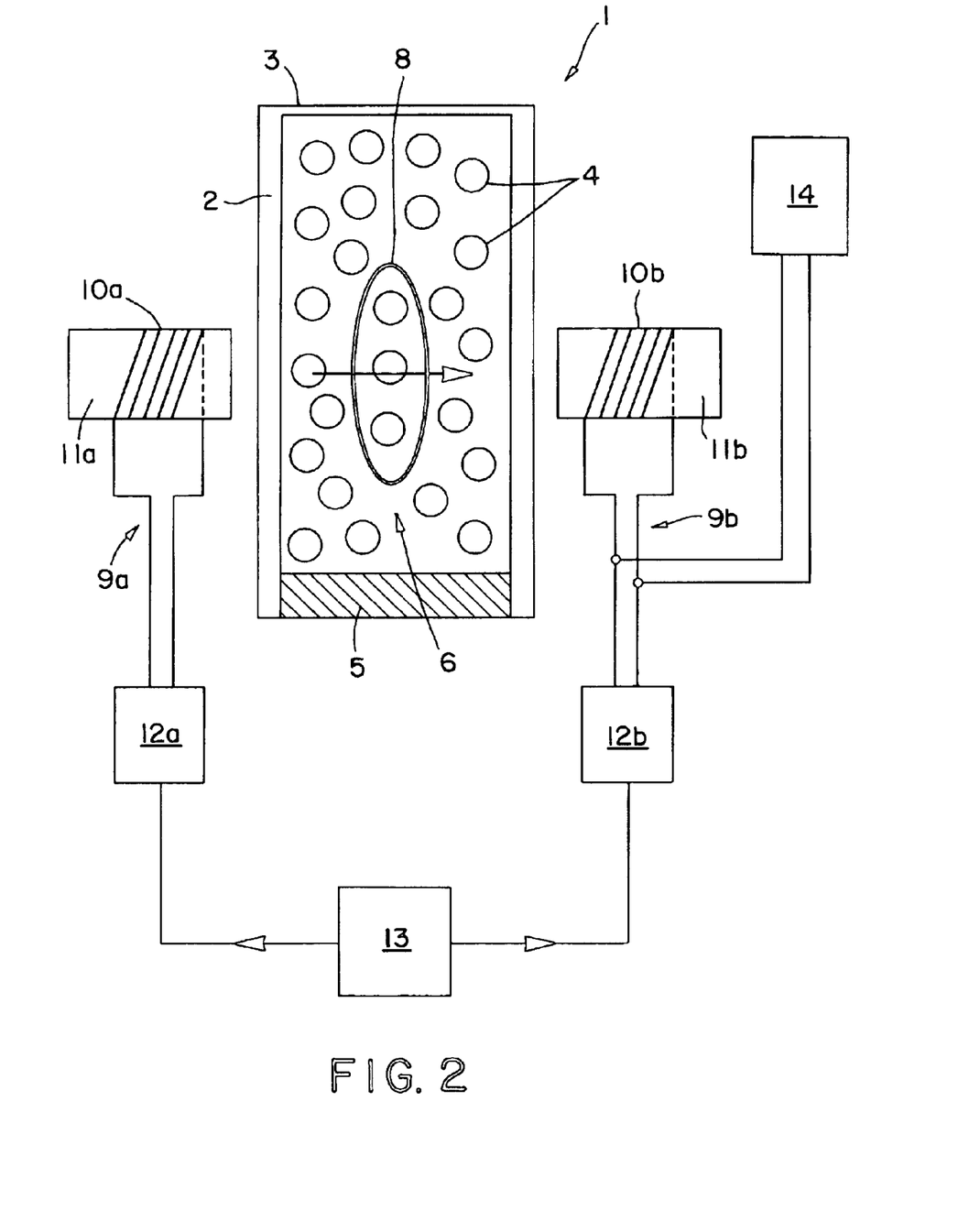
Figure 6A:
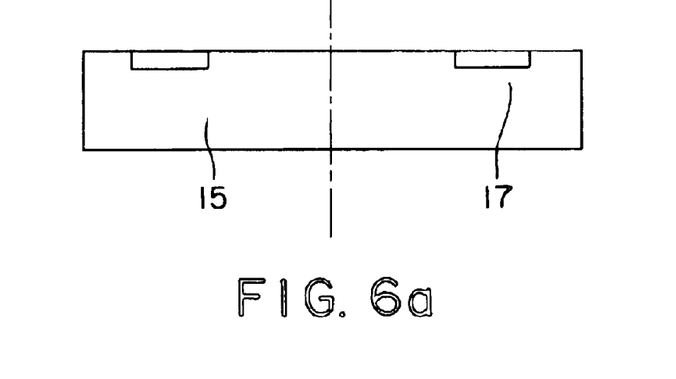
Figure 6B:
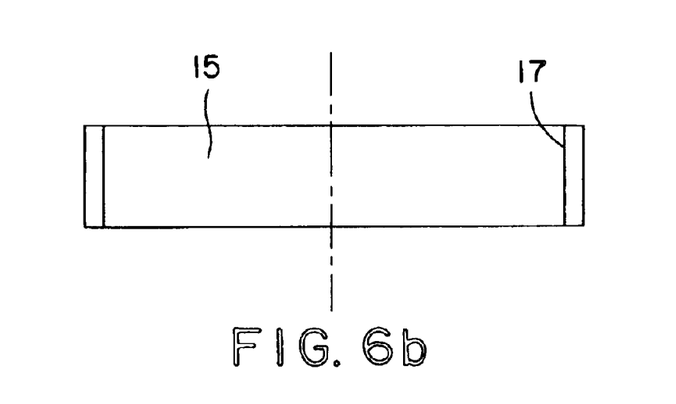
Figure 6C:
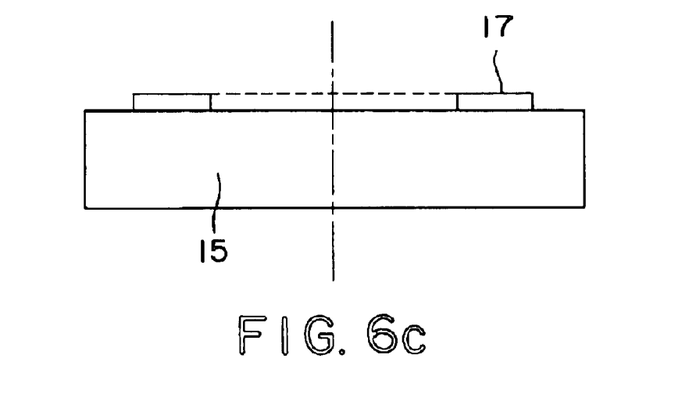
Figure 6D:
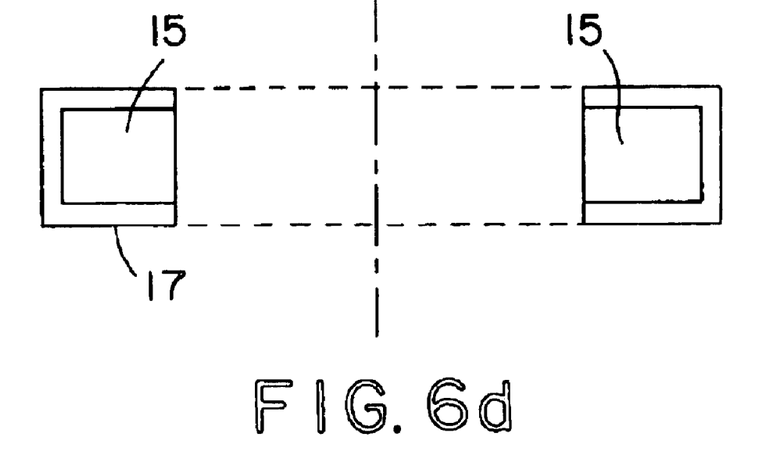
Figure 6E:
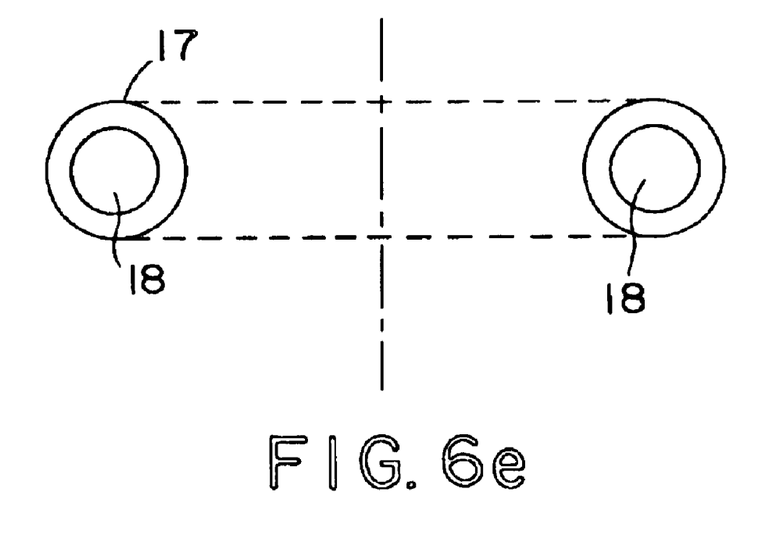

FIGS. 6a to 6e show as a section five possibilities for alternatively implementing the closed resistance wire 8 as shown in FIGS. 1 to 3. In the embodiment as shown in FIG. 6a, a closed groove which is filled with at least one metal layer 17 is machined into a carrier plate 15 of insulating or poorly conductive material. This corresponds essentially to the arrangement as shown in FIG. 5, but with the difference that there is only one single secondary winding here. In the embodiment as shown in FIG. 6b at least one metal layer surrounds the carrier plate 15 on its outside edge like a tire. FIG. 6c shows one alternative in which at least one metal layer 17 is applied directly to the surface of the carrier plate 15. Various processes are possible for this production step, for example vapor deposition using the corresponding masks or large-area coating with subsequent etching out of the desired conductor structure. In the embodiment as shown in FIG. 6d, the carrier plate 15 was first completely coated with at least one metal layer 17 and then provided with a hole so that only the annular, closed conductor structure remains. Finally, FIG. 6e shows one especially preferred version in which an annular core 18 of insulating or poorly conductive material plays the part of the previous carrier plate 15. The annular core 18 is coated with at least one metal layer 17 so that a closed conductor structure is obtained here as well and it forms the secondary circuit which is necessary for the inductively activatable firing capsule.

What is claimed is:

1. An inductively activatable firing capsule for the gas generator of a passenger restraint system in a motor vehicle, especially for a gas generator of an inflatable impact protection cushion, said capsule comprising a pot-shaped housing (2) which is filled at least partially with an igniting agent (4), outside the housing (2) at least one primary circuit (9; 9a, 9b) with a primary winding (10; 10a, 10b) which responsive to a vehicle collision is supplied with a trigger current, and within the housing (2) at least one secondary circuit (6) containing a secondary winding (7) and connected in series thereto a resistance wire (8), the resistance wire (8) penetrating the igniting agent (4) or being located in the immediate vicinity of the igniting agent (4), and at least one secondary winding (7) being inductively coupled to at least one primary winding (10; 10a, 10b).

2. A firing capsule as claimed in claim 1, said housing (2) being hermetically sealed by a sealing body (5).

3. A firing capsule as claimed in claim 1, wherein the housing (2) comprises an insulating material.

4. A firing capsule as claimed in claim 2, wherein the sealing body (5) comprises an insulating material.

5. A firing capsule as claimed in claim 1, wherein at least one primary winding (10; 10a, 10b) and at least one secondary winding (7) each surround a magnet core (11; 11a, 11b).

6. A firing capsule as claimed in claim 5, is comprising a common magnet core (11) which penetrates a sealing body (5) hermetically sealing said housing.

7. A firing capsule as claimed in claim 5, wherein at least one primary winding (10; 10a, 10b) and at least one secondary winding (7) each comprises its own magnet core (11; 11a, 11b).

8. A firing capsule as claimed in claim 1, wherein at least one secondary circuit (6) comprises an annularly closed resistance wire (8) which is located in the housing (2) of the firing capsule (1) such that it is inductively coupled to at least one primary winding (10; 10a, 10b) outside of the housing (2).

9. A firing capsule as claimed in claim 8, wherein there is at least one annularly closed resistance wire (8) on the carrier plate (15).

10. A firing capsule as claimed in claim 9, wherein two annularly closed resistance wires (8; 8a, 8b) at a time are located electrically insulated from one another on opposite sides of each carrier plate (15).

11. A firing capsule as claimed in claim 1, wherein there are at least two primary circuits (9; 9a, 9b) and one secondary circuit (6), the electrical power which is coupled into the secondary circuit (6) by one of the primary circuits (9; 9a, 9b) at a time being dimensioned such that the igniting agent (4) is not caused to explode.

12. A firing capsule as claimed in claim 1, wherein the trigger current is a sinusoidal or rectangular alternating current.

13. A test circuit for an inductively activatable firing capsule as claimed in claim 1, said test circuit being connected in parallel to at least one primary winding (10; 10a, 10b) and delivers a weak AC voltage signal to at least one primary winding (10; 10a, 10b) and wherein it contains for detecting a change in alternating current flowing in at least one primary winding (10; 10a, 10b).

14. A test circuit as claimed in claim 13, wherein it produces an alarm signal when the alternating current flowing in at least one primary winding (10; 10a, 10b) changes.

15. A test circuit as claimed in claim 13, wherein the weak AC voltage signal is delivered at regular time intervals or continuously.

16. An inductively activatable firing capsule as claimed in claim 1, wherein at least one secondary circuit located within the firing capsule housing (2) comprises a closed resistance element.

17. An inductively activatable firing capsule as claimed in claim 16, wherein the closed resistance element has a rectangular, square or round cross section.

18. An inductively activatable firing capsule as claimed in claim 16, wherein the closed resistance element has an annular configuration.

19. An inductively activatable firing capsule as claimed in claim 16, wherein the closed resistance element has fewer than 10 turn.

20. An inductively activatable firing capsule as claimed in claim 16, wherein the closed resistance element comprises an annular core (18) of insulating or poorly conductive material coated by at least one metal layer (17).

21. An inductively activatable firing capsule as claimed in claim 16, wherein the closed resistance element comprises at least one metal layer (17) applied to a carrier plate (15) of insulating or poorly conductive material.

22. An inductively activatable firing capsule as claimed in claim 16, wherein the closed resistance element comprises at least one metal layer (17) embedded in a groove (16) of a carrier plate (15) of insulating or poorly conductive material.

23. An inductively activatable firing capsule as claimed in claim 21, wherein the carrier plate (15) comprises the sealing body (5) of the firing capsule housing (2).

24. An inductively activatable firing capsule as claimed in claim 20, wherein the annular core (18) consists of glass, ceramic or plastic.

25. An inductively activatable firing capsule as claimed in claim 21, wherein the carrier plate (15) comprises glass, ceramic or plastic.

26. An inductively activatable firing capsule as claimed in claim 1, wherein at least one metal layer (17) comprises at least one metal having a high specific resistance.

27. An inductively activatable firing capsule as claimed in claim 1, comprising at least two primary circuits triggered by a common impact sensor (13).

28. An inductively activatable firing capsule as claimed in claim 1, comprising at least two primary circuits, each primary circuit being triggered by a common impact sensor (13).

29. An inductively activatable firing capsule according to claim 19, wherein the closed resistance element has one turn.

* * * * *

UNITED STATES PATENT AND TRADEMARK OFFICE
CERTIFICATE OF CORRECTION

PATENT NO. : 6,722,282 B2
DATED : April 20, 2004
INVENTOR(S) : Guenter Duerschinger

It is certified that error appears in the above-identified patent and that said Letters Patent is hereby corrected as shown below:

Title page,
Item [30], Foreign Application Priority Data, insert
-- October 2, 2000, (DE) 100 48 869 --

Column 5,
Line 7, reads "claim 5, is comprising" should read -- claim 5, comprising --.

Signed and Sealed this

Eighteenth Day of January, 2005

JON W. DUDAS
*Director of the United States Patent and Trademark Office*